United States Patent
Levonas et al.

(10) Patent No.: US 9,426,283 B2
(45) Date of Patent: Aug. 23, 2016

(54) METHOD AND APPARATUS OF OPTIMIZING AN XDSL TRANSCEIVER CONFIGURATION USING SINGLE ENDED LINE TEST (SELT) MEASUREMENT

(71) Applicant: IKANOS COMMUNICATIONS, INC., Fremont, CA (US)

(72) Inventors: Robin Levonas, Homdel, NJ (US); Vipin Pathak, Eatontown, NJ (US); Arnold Muralt, Fair Haven, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 0 days.

(21) Appl. No.: 14/671,516

(22) Filed: Mar. 27, 2015

(65) Prior Publication Data

US 2015/0281434 A1   Oct. 1, 2015

Related U.S. Application Data

(60) Provisional application No. 61/971,401, filed on Mar. 27, 2014.

(51) Int. Cl.
*H04M 1/24*   (2006.01)
*H04M 3/08*   (2006.01)
*H04M 3/22*   (2006.01)
(Continued)

(52) U.S. Cl.
CPC ............... *H04M 3/306* (2013.01); *H04M 3/32* (2013.01)

(58) Field of Classification Search
CPC ..... H04M 3/306; H04M 3/302; H04M 11/06; H04M 15/56; H04M 2215/202; H04B 3/46; H04B 3/03; H04B 3/23

USPC .......... 379/1.01, 1.03, 1.04, 22.01, 22.02, 379/22.08, 24, 27.01, 27.02, 28, 30, 23
See application file for complete search history.

(56) References Cited

U.S. PATENT DOCUMENTS 6,229,846 B1 * 5/2001 Lassig ............... H04M 11/06
                                                                    375/222
7,010,025 B1 * 3/2006 Helfenstein ............ H04B 3/03
                                                                    326/30

(Continued)

FOREIGN PATENT DOCUMENTS

WO    WO 00/79693 A1   12/2000

OTHER PUBLICATIONS

International Search Report and Written Opinion Issued Jul. 8, 2015 for PCT/US2015/023112.

*Primary Examiner* — Binh Tieu
(74) *Attorney, Agent, or Firm* — Holland & Hart LLP (57) ABSTRACT

The present invention relates to a method by which an xDSL modem can be properly connected and/or optimally tuned to achieve a desired performance goal based on knowledge obtained by first performing a SELT test and then post-processing the results of that test. In embodiments, the processed SELT results are used to detect bad connections or other anomalies such as split pairs. In embodiments, the processed SELT results are used to configure programmable components and filters in the analog front end in a manner that achieves the performance goal. In these and other embodiments, the performance goal is to maximize the attainable data rate. As such, through various hardware design options and configurations according to the invention, the performance of the modem can be tuned such that even in the presence of undesirable loop characteristics, adequate, or even good performance, can be achieved.

16 Claims, 6 Drawing Sheets

(51) Int. Cl.
*H04M 3/30* (2006.01)
*H04M 3/32* (2006.01)

(56) References Cited

U.S. PATENT DOCUMENTS

| | | |
|---|---|---|
| 9,054,785 B2 * | 6/2015 | Berg |
| 2005/0069028 A1 * | 3/2005 | Belge .................... H04B 3/542 375/222 |
| 2005/0164287 A1 | 7/2005 | Hu et al. |
| 2006/0120442 A1 * | 6/2006 | Melsa .................... H04B 3/493 375/222 |
| 2008/0279269 A1 | 11/2008 | Duvaut et al. |
| 2009/0024340 A1 * | 1/2009 | Borjesson ............. H04M 3/306 702/65 |
| 2010/0086105 A1 * | 4/2010 | Dinesh .................. H04M 3/302 379/27.03 |
| 2011/0058468 A1 * | 3/2011 | Singh .................... H04M 3/304 370/201 |
| 2012/0069883 A1 * | 3/2012 | Fertner .................... H04B 3/46 375/222 |
| 2012/0221271 A1 * | 8/2012 | Berg ........................ H04B 3/48 702/65 |
| 2014/0334609 A1 * | 11/2014 | Flowers ................ H04M 3/306 379/1.04 |
| 2015/0030059 A1 | 1/2015 | Kalavai et al. |
| 2015/0030137 A1 | 1/2015 | Levonas et al. |
| 2015/0030138 A1 | 1/2015 | Kalavai et al. |

* cited by examiner

METHOD AND APPARATUS OF OPTIMIZING AN XDSL TRANSCEIVER CONFIGURATION USING SINGLE ENDED LINE TEST (SELT) MEASUREMENT

CROSS-REFERENCE TO RELATED APPLICATIONS

The present application claims priority to U.S. Prov. Appln. No. 61/971,401, filed Mar. 27, 2014, the contents of which are incorporated by reference herein in their entirety.

FIELD OF THE INVENTION

The present invention relates generally to xDSL communications, and more particularly to methods and apparatuses for optimizing the configuration and/or performance of an xDSL transceiver using results of a SELT measurement.

BACKGROUND OF THE INVENTION

Conventional xDSL services, including ADSL and VDSL, are deployed over copper loops that can have a wide range of topologies and characteristics. As such, these loops can have many undesirable characteristics that will negatively impact the performance of either ADSL or VDSL modems. One such loop characteristic that can negatively affect the performance of an xDSL modem is a bridge tap. A bridge tap is a relatively short segment of twisted pair wire that is "bridged" onto the main loop at some distance, d, from the customer's modem. A bridge tap can, and in many cases does, exist within a customer's home itself.

Single-ended line tests (SELT) are conventionally used in xDSL systems to identify loop impairments such as bridge taps. As is known in the art, SELT involves transmitting a known signal, capturing and measuring the resultant S11 frequency domain data, and then performing an inverse Fourier transform on the S11 to derive the time domain equivalent of the frequency domain S11 data. Such a time domain signal will typically exhibit peaks at the points of discontinuity in the loop. So, by analyzing the peak information one can determine various characteristics of the loop. See, for example, U.S. patent application Ser. Nos. 14/341,538 and 14/341,576, commonly owned by the present assignee, the contents of which are incorporated by reference herein in their entirety.

Nevertheless, certain loop characteristics cannot be accurately determined merely by analyzing peaks in the time domain S11 signal. Moreover, conventional techniques do not adequately address how to dynamically mitigate certain characteristics which can adversely affect xDSL transceiver performance. Accordingly, a need remains to more accurately determine loop characteristics and to mitigate the effects of characteristics that can negatively affect xDSL modem performance.

SUMMARY OF THE INVENTION

The present invention relates to methods and apparatuses for optimizing the configuration and/or performance of an xDSL transceiver using results of a SELT measurement. Embodiments of the invention include a method by which an xDSL modem can be properly connected and/or optimally tuned to achieve a desired performance goal based on knowledge obtained by first performing a SELT test and then post-processing the results of that test. In embodiments, the processed SELT results are used to detect bad connections or other anomalies such as split pairs. In embodiments, the processed SELT results are used to configure programmable components and filters in the analog front end in a manner that achieves the performance goal. In these and other embodiments, the performance goal is to maximize the attainable data rate. As such, through various hardware design options and configurations according to the invention, the performance of the modem can be tuned such that even in the presence of undesirable loop characteristics, adequate, or even good performance, can be achieved.

In accordance with these and other aspects, a method according to embodiments of the invention includes performing a single ended line test (SELT) test on a loop coupled to a xDSL modem and post-processing a result of the SELT test to determine an impedance of the loop.

In further accordance with the above and other aspects, an apparatus according to embodiments of the invention includes a xDSL modem coupled to a loop, the xDSL modem including a transmit path and a receive path and a single ended line test (SELT) block coupled to the transmit path and the receive path for performing a SELT test on the loop, wherein the SELT block includes a post-processing block that post-processes a result of the SELT test to determine an impedance of the loop.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, the present inventors recognize that the performance of an xDSL modem is impacted, in part, by the loop conditions seen by the modem, looking into the network. Particularly, anything that affects the loop impedance, such as a bridge tap, can have deleterious effects on the modem performance, if not properly compensated in the modem's transmit and/or receive paths. Thus it is desirable to be able to determine the loop impedance as seen by the modem and to be able to do this for all frequencies of interest.

The present inventors further recognize that modem performance can be optimized if the modem has knowledge of key parameters, such as the loop reflection coefficient, S11. From this it is then possible to determine the wiring topology of the loop to determine, for example, the presence of a bridge tap, and to also derive the complex impedance profile of the loop.

According to aspects of the invention, with knowledge of such an impedance profile, the modem can be automatically configured, using various switchable analog filters in the transmit and receive paths, such that the adverse impact of certain loop characteristics such as a bridge tap is reduced with a corresponding increase, or improvement, in the modem performance as measured by attainable data rate. Likewise, with knowledge that a bridge tap is not present, these same filters can be automatically removed from the transmit and receive paths, or their characteristics can be modified, such that the straight loop performance is optimized, as measured by the same attainable data rate.

Figure 1:
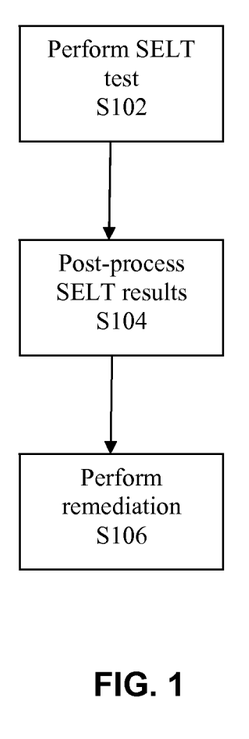
FIG. 1 is a flowchart illustrating an example methodology according to embodiments of the invention.

FIG. 1 is an example methodology according to embodiments of the invention. In embodiments, the methodology includes performing a conventional Single Ended Line Test (SELT). The present inventors recognize, however, that this same test can also accurately measure the complex impedance characteristics of the loop to which it is connected. Accordingly, a method according to the invention starts in step S102 with a SELT test.

The SELT technique involves the transmission of a known sequence such as a periodic sequence of REVERB symbols formed from a set of available tones in the xDSL system. Preferably, tones from both upstream and downstream bands are used (see, e.g. U.S. patent application Ser. No. 14/339,862 filed Jul. 24, 2014, the contents of which are incorporated herein by reference in their entirety), but this is not necessary in all embodiments. The SELT technique further includes simultaneously receiving a reflected version of the same (i.e. S11) and processing this reflection in a manner that allows the information of interest to be extracted. In the context of improving an xDSL modem's performance, the present inventors have discovered that an important parameter that can be extracted from a SELT measurement is the loop impedance.

The loop impedance is derived from the SELT measured reflection coefficient, or $S_{11}$. By definition, the reflection coefficient is:

$$S_{11} = r_x/t_x$$

Where $r_x$ is the received signal, and $t_x$ is the transmitted signal.

As set forth above, conventional SELT includes converting the frequency domain $S_{11}$ signal to the time domain and analyzing it to identify impairments. According to aspects of the invention, however, in addition to obtaining this time domain signal, the loop topology can be derived by post processing the loop reflection coefficient, as shown in step S104 of FIG. 1. The loop topology will indicate the presence or absence of such things as bridge taps.

In embodiments, post processing in step S104 includes deriving from the frequency domain $S_{11}$ signal the complex line impedance Zin as follows:

$$Zin(s) = Z0*[1+S_{11}(s)]/[1-S_{11}(s)],$$

where Z0 is the reference impedance and is typically equal to 100Ω for twisted pair cables.

In embodiments, all of this information can then be used to take remedial action as shown in step S106 of FIG. 1. For example, the user and/or the service provider can be alerted to any issue and its root cause. Specific recommendations can be made to remedy or alleviate the problem.

The following are example remediation techniques that can be performed in step S106 using the above-described SELT-derived information according to embodiments of the present invention.

At the time of installation of xDSL customer premises equipment (CPE), step S106 in embodiments of the invention can be performed at the CPE to detect and alert users or other personnel of wiring issues (e.g. mis-paired cables, bad connections, low grade cables such as flat cable instead of twisted pair). Embodiments of the invention can also detect and alert users or other personnel regarding the presence of POTS phones without micro data filters.

Figure 2:
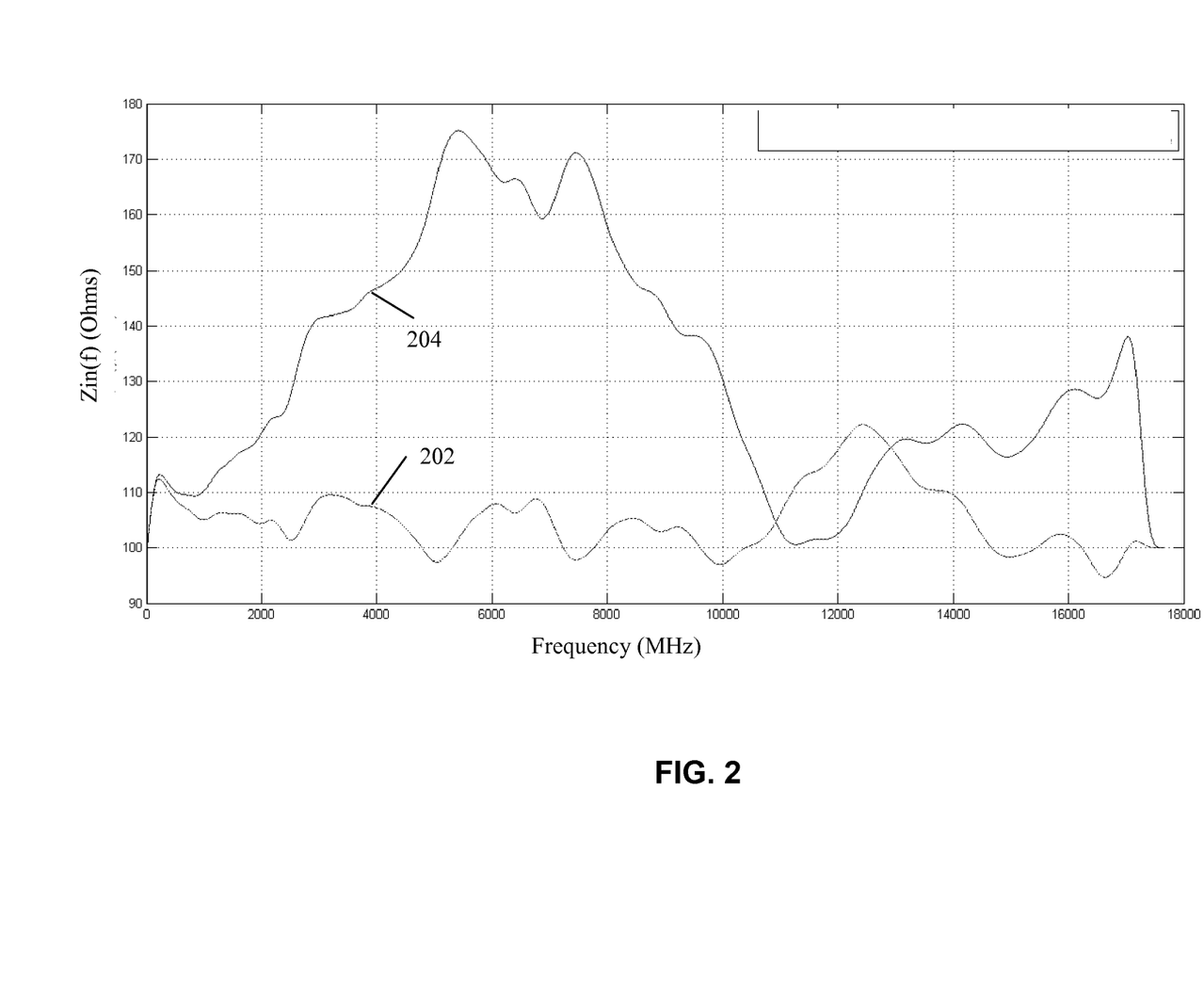
FIG. 2 is a plot illustrating aspects of processing SELT measurements to obtain a loop impedance according to aspects of the invention.

FIG. 2 is a graph illustrating an example of how embodiments of the invention can be used to detect a flat cable. More particularly, FIG. 2 shows the resultant impedance plot 202 for a straight 2 Kft open circuit loop compared to the plot 204 with a 25 ft flat, untwisted cable connecting the modem to the 2 Kft loop. As is evident from this plot, the behavior of the impedance in the flat cable case is very poor. The average impedance across the band here is approximately 132.27 ohms vs. 105.23 ohms for the straight loop case.

During operation, embodiments of the invention can be used to detect and alert users of bad connections or the presence of any POTS phones that have been added without micro data filters.

At the time of installation, step S106 in embodiments of the invention can be used at the CO to verify that patch cables are matched to loops. Patch cables used to connect the DSLAM to a loop should have a characteristic impedance that is close to the characteristic impedance of the loop to avoid signal reflections. Loop impedance can vary between approximately 80 ohms and 150 ohms depending on the type of cable used and varies regionally.

Embodiments of the invention can also be used at CO installation to detect mis-paired connections. For example, connector pin-outs of standard connectors used for patch cables vary from one vendor to another. This can lead to mis-paired connections. Embodiments of the invention can also be used to detect pair separation, including pairs of loosely twisted wires that have become separated due to improper installation.

During operation, embodiments of the invention can be used to detect connectivity and accidental wiring changes. This can include detection of mis-paired cables (split pairs). In a mis-paired cable, a connection uses one wire from a first pair and one wire from a second, different pair. Mis-paired connections are also known as split pairs. Split pairs appear to have normal connectivity at low frequencies, but show much worse crosstalk and impedance behavior at higher frequencies. Both effects degrade xDSL performance. Split pairs can be detected because of their different impedance (generally higher than normal correctly paired connections).

It should be noted that the length of bad wiring must be more than some minimum length before it can be detected. A very short run (less than a few feet) of a split or separated pair may not be detected as its impedance does not sufficiently deviate from the normal impedance behavior.

According to certain additional aspects, embodiments of step S106 according to the invention include using the post-processed SELT results to configure the analog front end to mitigate issues that can affect xDSL performance. As one example, the present inventors recognize that the complex line impedance Zin determines the transhybrid gain (THG) which can be expressed as $$THG=[Zin(s)-Zm(s)]/[Zin(s)+Zm(s)],$$

where Zm(s) is the hybrid matching impedance. Notice that THG=0 when the line impedance matches the matching impedance, Zin=Zm. Zm(s) may be a complex value that is fixed for a given design or it may be adjustable, i.e., Zm=Zm(s, p1, p2, . . . , pm), where p1, . . . , pm denote parameters that could be controlled manually by a user or automatically by software. Embodiments of how these adjustable parameters can be implemented using matching structures according to the invention will be described in more detail below. It should be noted, moreover, that, according to aspects of the invention, minimizing THG will yield best performance for a given Zin(s) over the frequency range of interest.

As another example, the action of a hybrid may also be described more generally in terms of transfer functions as follows $$THG=HEcho(s,Zin)-HHybrid(s),$$

where HEcho is a function of Zin, and is dependent on implementation. In a typical hybrid circuit with backmatching, Rbm, Hecho(s) would simply be $$HEcho(s)=Zin(s)/[Rbm+Zin(s)]$$

Notice that THG=0 when the echo transfer function HEcho matches HHybrid(s), i.e., HEcho=HHybrid(s). Depending on implementation, HHybrid(s) can either be fixed or adjustable via a number of parameters, i.e., HHybrid=HHybrid(s, p'1, p'2, . . . , p'n). The parameters p' could be controlled manually by a user or automatically by software, example embodiments of which will be described in more detail below.

Figure 3:
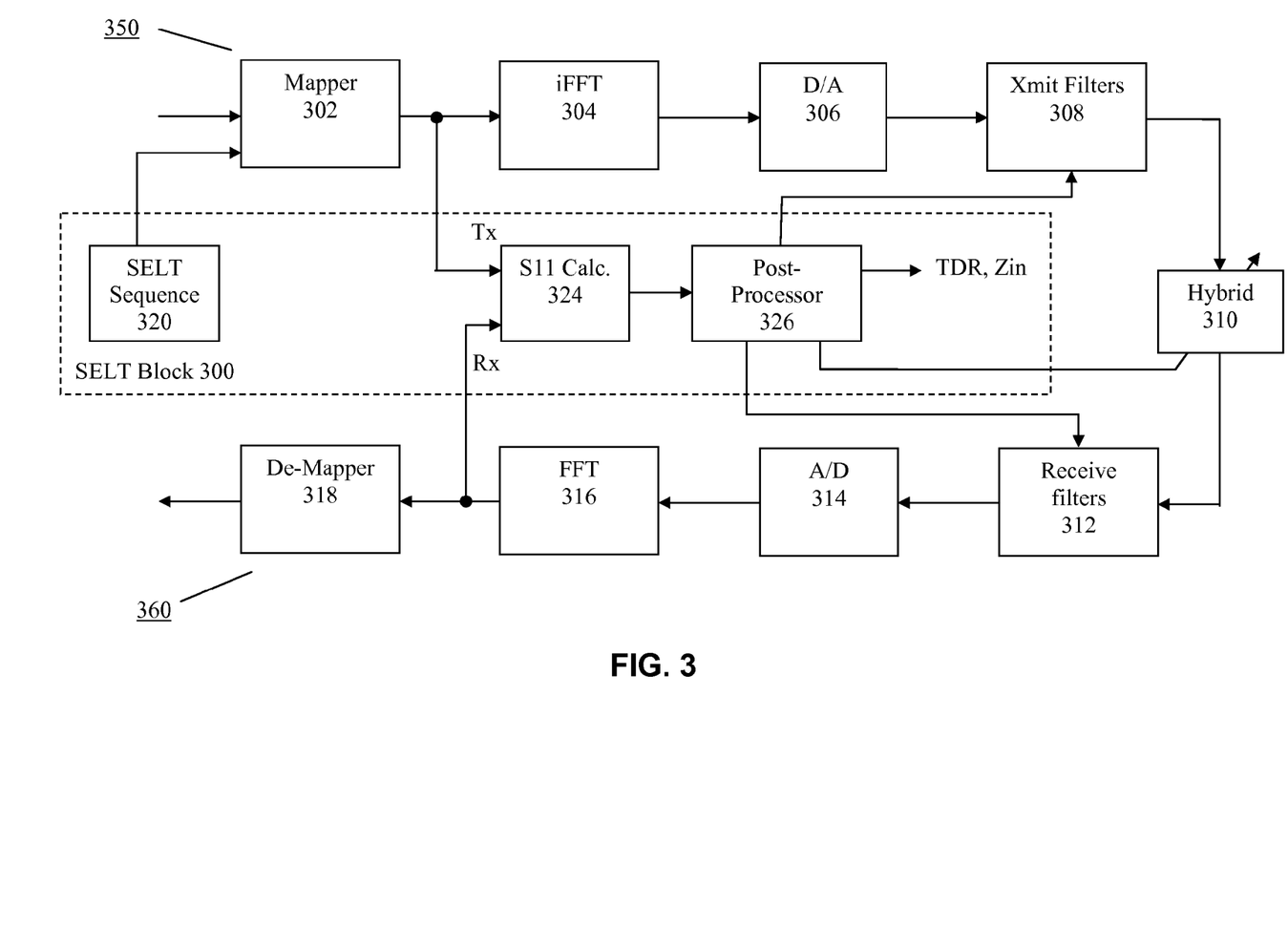
FIG. 3 is a block diagram illustrating an example SELT apparatus in accordance with embodiments of the invention.

To assist in understanding these and other aspects of the invention, FIG. 3 is a block diagram illustrating an example SELT block 300 according to embodiments of the invention. As shown, block 300 is interposed between a transmit chain 350 and receive chain 360 of a xDSL modem. Embodiments of the invention can be implemented by xDSL modem chipsets and associated firmware such as a Vx185 platform, as well as software diagnostic suites such as Insight provided by Ikanos Communications. Those skilled in the art will understand how to implement the present invention by adapting these and other chipsets, firmware and/or software with the SELT functionality of the invention after being taught by the present examples.

It should be noted, that typical xDSL modems include many additional components than shown in FIG. 3, including controllers and other processors that can interact with the components shown in FIG. 3 such as for initiating and performing SELT tests, collecting and storing or transmitting results, etc. Such components and functionalities are well known to those skilled in the art and so additional details thereof will be omitted here for sake of clarity of the invention.

It should be further noted that apparatuses according to the invention are not limited to being incorporated in a xDSL modem as shown in FIG. 3. For example, embodiments of the invention can be incorporated in dedicated testing equipment, remote testing equipment, server side modems, etc.

As shown, block 300 according to embodiments of the invention includes a SELT sequence block 320 that causes mapper 302 to form symbols for performing SELT tests according to techniques known to those skilled in the art. The symbols formed by mapper 302 (Tx) are converted to time domain by iFFT 304, and converted to analog signals by A/D 306. As shown in the example of FIG. 3, the analog signal can be optionally filtered by transmit filter(s) 308 before being transmitted onto the tip/ring connection of the modem via hybrid 310. The reflections of the transmitted signals are simultaneously sensed via hybrid 310, optionally filtered by receive filter(s) 312, digitized by A/D 314 and converted to frequency domain by FFT 316. Instead of being converted to data by de-mapper 318, the reflected symbols (Rx) are provided to S11 calculator block 324. Using the transmitted symbols (Tx) and the reflected symbols (Rx), block 324 determines the S11 signal using known techniques (e.g. S11=Rx/Tx). The frequency domain S11 signal from block 324 is further processed by post-processor block 326.

As described above and shown in FIG. 3, post-processing can include determining the time domain S11 signal (i.e. TDR) as is conventionally done, as well as determining the loop impedance (Zin) according to aspects of the invention. As will be described in more detail below, the results of post-processing can be used to configure the analog front end of the xDSL transceiver, including configuring one or more of transmit filters 308, hybrid 310 and receive filters 312.

For example, the computed loop impedance Zin according to embodiments of the invention can be used to adjust a hybrid matching impedance Zm or hybrid transfer function HHybrid. The computation of parameters for such matching components can be performed offline without iterative optimization. Offline computation can be combined with iterative adjustment. For example, an initial set of parameters can be computed offline, loaded into the hardware, and then adjustments can be made iteratively to minimize overall echo power or other goal function.

Figure 4:
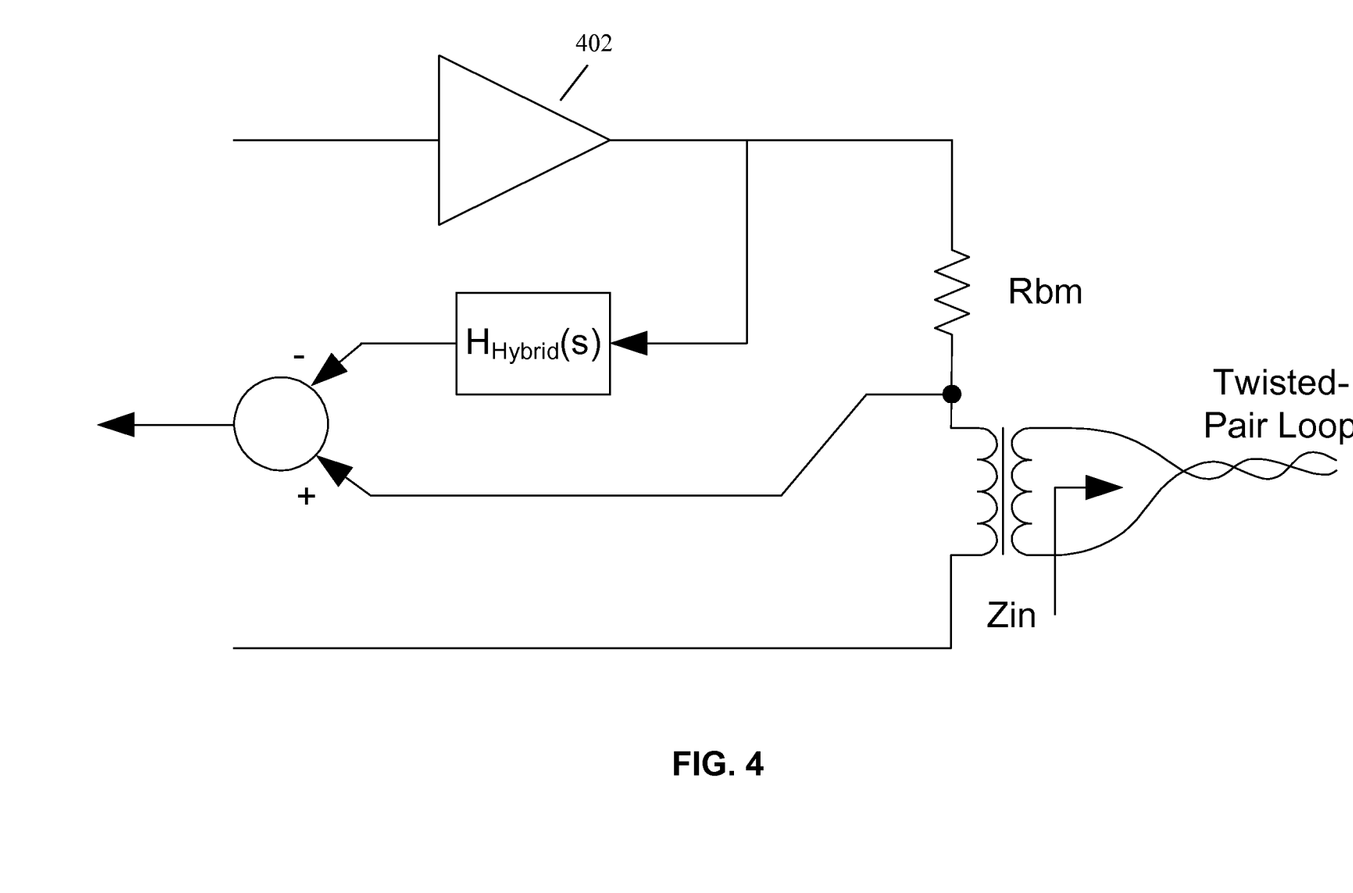
FIG. 4 is a block diagram illustrating an example hybrid for use in embodiments of the invention.

FIG. 4 is a block diagram illustrating an example hybrid 310 in accordance with these aspects of the invention. It should be noted that this diagram is simplified to assist in understanding aspects of the invention and that an actual hybrid can include additional components and can be configured in alternative ways.

As shown in FIG. 4, knowing the value of backmatching impedance Rbm, as well as the loop impedance Zin as determined according to embodiments of the invention, the parameters of a matching network HHybrid(s) can be determined to mitigate any adverse effects of loop impedance caused by impairments such as bridge taps. In embodiments, matching network HHybrid(s) can be as simple as a plurality of different passive components (e.g. resistors, capacitors, inductors) that can be selectively switched in and out of the circuit path so as to form a desired matching impedance. For example, matching network HHybrid(s) can include a finite number (e.g. 2, 3, etc.) of pre-determined RC impedance paths that can be selectively coupled using switches controlled by post-processor 326 based on the determined loop impedance Zin.

In other embodiments, matching network HHybrid(s) can also include active components such as amplifiers and the like. The number and complexity of components and configuration of this network can be based on design goals such as the range of impedances to account for and/or the precision of matching impedance desired. Those skilled in the art of impedance matching will understand how to design various adjustable networks that can be used to implement HHybrid(s) after being taught by the present examples, and so further details thereof will be omitted here for sake of clarity of the invention.

Figure 5:
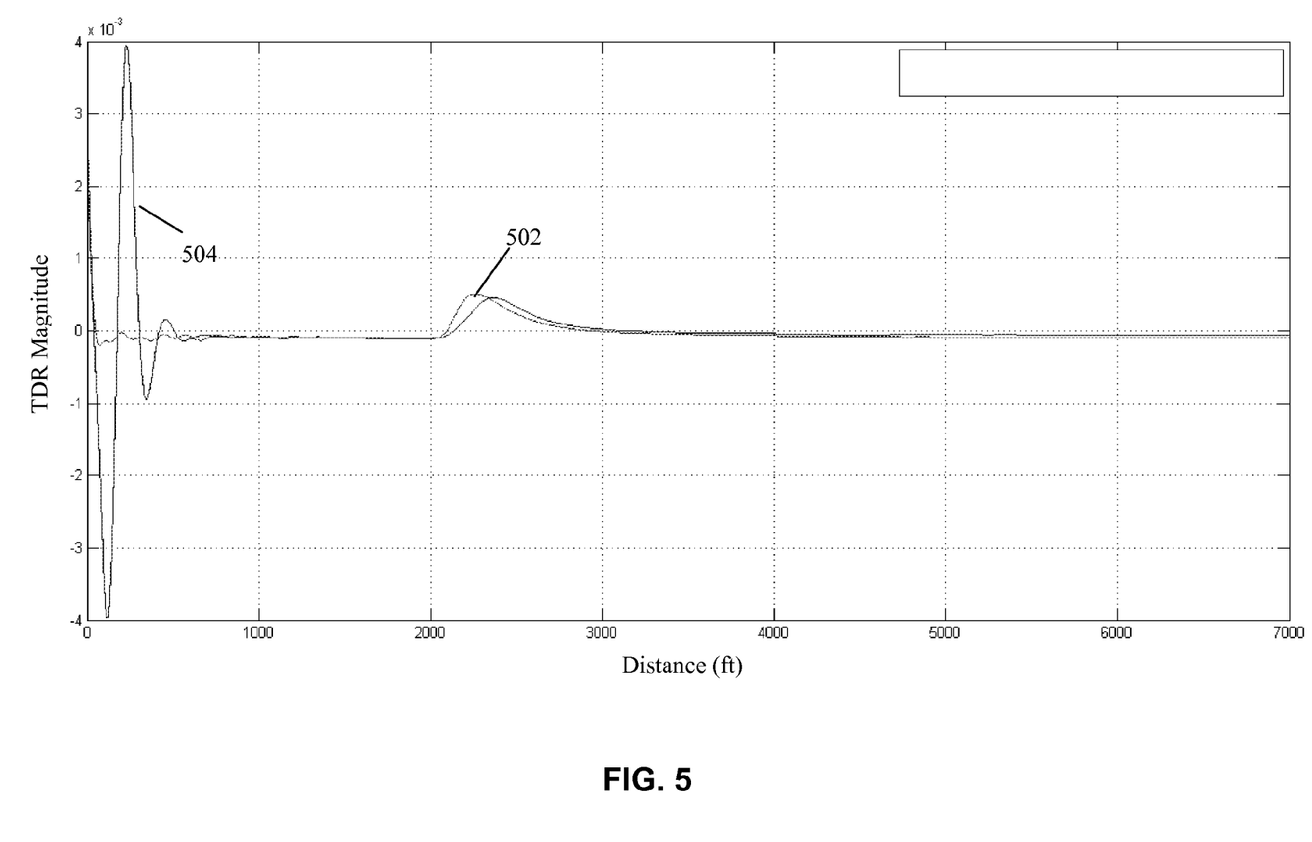
FIG. 5 is a plot illustrating how certain loop impairments can be identified using TDR measurements.
Figure 6:
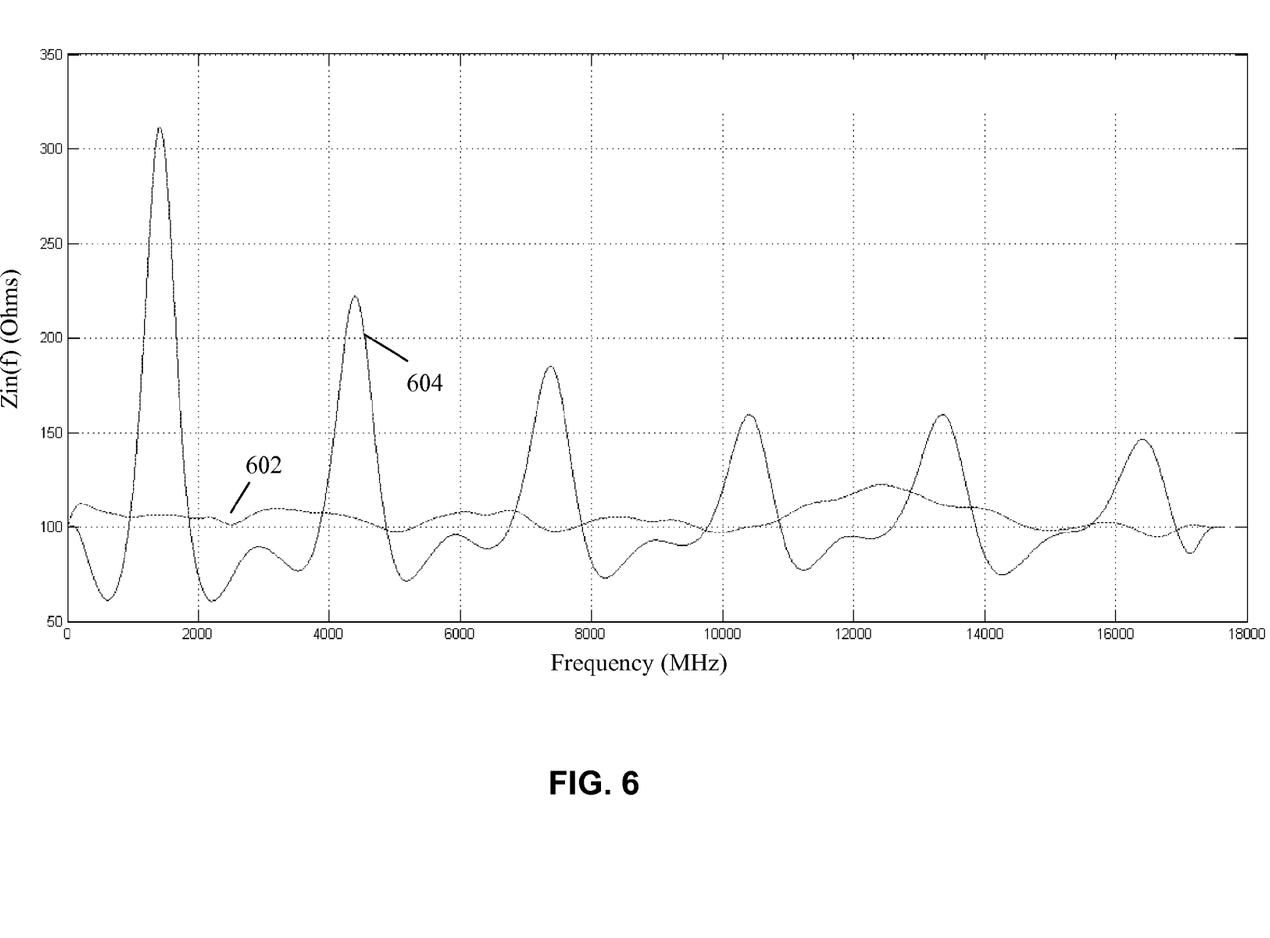
FIG. 6 is a plot illustrating how the loop impairments in FIG. 5 can be further characterized according to SELT measurement post-processing according to embodiments of the invention.

FIGS. 5 and 6 are example plots for assisting in understanding the impedance matching techniques of the present invention.

FIG. 5 is a plot showing an example time domain response (TDR response) 502 for a straight 2 Kft open circuit loop compared to the TDR response 504 on the same loop with a 100 ft bridge tap located at 100 ft. In response 504, the characteristic signature of the bridge tap can be seen, which is a large negative going peak followed by a large positive going peak. The location of these peaks indicates the bridge tap location and length, respectively. The peak starting at approximately 2000 ft is indicative of the end-of-loop open circuit.

FIG. 6 is a plot showing the resultant impedance plots for the same conditions, 2 Kft open (plot 602) versus a 2 Kft open with 100 ft BT at 100 ft. (plot 604). As can be seen, the impedance for the straight open circuit loop is relatively well behaved with an average value somewhere around 100 ohms. The loop with the 100 ft bridge tap shows a much different behavior versus frequency. Notably, periodic peaks in the impedance can be seen. Since these peaks indicate an impedance that is very different from the nominal 100 ohms, this is information that would be used to tune the AFE circuitry accordingly. As set forth above, for example, knowing the exact frequencies at which these peaks occur, the matching network HHbyrid(s) shown in FIG. 4 can be adjusted accordingly.

In addition to impedance matching using the adjustable network HHybrid(s), embodiments of the invention can also be used to determine optimum settings of line driver 402 (e.g., bias). For example, bias can be increased if the loop impedance is lower than normal.

Returning to FIG. 3, embodiments of the invention can adjust a receiver transfer function using receive filter(s) 312 based on the determined values of HHybrid(s) and/or HEcho(s) as described above). For example, post processor 326 can select one or several band stop filters to reject transmitter echo In a situation where loop impedance is well behaved and therefore high transhybrid loss is available to reject echo, filters are not needed and one or all of the filters can be powered down to minimize power consumption.

Likewise, embodiments of the invention can adjust a transmit transfer function using transmit filter(s) 308 based on the determined values of HHybrid(s) and/or HEcho(s) as described above). The purpose of transmit filters is to minimize out-of-band energy that would impair the receiver if not rejected sufficiently by the hybrid. Transmit filters can be enabled for bands where loop impedance and hybrid response are ill behaved and powered down in bands that need no filtering since loop impedance and hybrid response are well behaved.

Embodiments of the invention can further be used to allocate transmit and receive filter resources. For example, in some implementations, only a small number of receive filters may be available. If the number of receive filters is less than the number of echo bands to be suppressed, available resources can be configured to reject the bands that would receive the highest echo. The echo can be estimated based on the measured loop impedance and the transmitted signal spectrum. Similarly, when transmit filter resources are restricted, available resources can be deployed to reject the bands that would be most impaired because of ill-behaved loop impedance and transhybrid loss.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
   performing a single ended line test (SELT) test on a loop coupled to a xDSL modem;
   post-processing a result of the SELT test to determine an impedance of the loop;
   determining that the impedance of the loop deviates from an impedance associated with a loop topology of the xDSL modem based at least in part on the post-processing; and
   configuring, during operation of the xDSL modem, a cutoff frequency of one or more analog filters associated with a hybrid of the xDSL modem based at least in part on the deviation.

2. The method of claim 1, wherein the result of the SELT test comprises a frequency domain S11 signal.

3. The method of claim 1, further comprising configuring a matching network of the hybrid of the xDSL modem based at least in part on the determined impedance of the loop.

4. The method of claim 3, further comprising dynamically selecting at least one passive component of a plurality of passive components to include in a signal path of the matching network of the hybrid.

5. The method of claim 3, wherein the matching network of the hybrid includes a backmatching impedance, wherein configuring includes accounting for the backmatching impedance in combination with the determined impedance of the loop.

6. The method of claim 1, wherein the one or more analog filters are associated with one or both of a receive path and a transmit path of the xDSL modem, and
   wherein the configuring includes turning off the one or more analog filters.

7. The method of claim 1, wherein post-processing further includes determining a transhybrid gain (THG) of the xDSL modem.

8. The method of claim 1, wherein post-processing further includes determining an echo transfer function of the xDSL modem.

9. The method of claim 1, further comprising determining that the loop has a mispaired cable based at least in part on the determined impedance of the loop.

10. The method of claim 1, further comprising determining that the loop has a split pair based at least in part on the determined impedance of the loop.

11. The method of claim 1, further comprising determining that the loop has a flat cable based at least in part on the determined impedance of the loop.

12. An apparatus including a xDSL modem coupled to a loop, comprising:
   a transmit path and a receive path; and
   a single ended line test (SELT) block coupled to the transmit path and the receive path for performing a SELT test on the loop,
   wherein the SELT block includes a post-processing block that post-processes a result of the SELT test to determine that an impedance of the loop deviates from an impedance associated with a loop topology of the xDSL modem; and
   wherein the post-processing block of the SELT block is further to configure, during operation of the xDSL modem, a cutoff frequency of one or more analog filters associated with a hybrid of the xDSL modem based at least in part on the deviation.

13. The apparatus of claim 12, wherein the result of the SELT test comprises a frequency domain S11 signal.

14. The apparatus of claim 12, wherein the SELT block is further to configure a matching network of the hybrid of the xDSL modem based at least in part on the determined impedance of the loop.

15. The apparatus of claim 14, wherein the matching network of the hybrid includes a plurality of passive components, and wherein the SELT block configures the matching network of the hybrid by dynamically selecting at least one passive component of the plurality of passive components to include in the signal path of the matching network of the hybrid.

16. The apparatus of claim 12, wherein the matching network of the hybrid includes a backmatching impedance.

* * * * *